United States Patent Office 3,480,496
Patented Nov. 25, 1969

3,480,496
METHODS OF MANUFACTURING PNEUMATIC TIRES
Henry Raymond Fletcher, Birmingham, England, assignor to Dunlop Rubber Company Limited, Birmingham, England, a corporation of Great Britain
Filed Aug. 27, 1965, Ser. No. 483,261
Claims priority, application Great Britain, Sept. 15, 1964, 37,555/64
Int. Cl. B29h 17/02
U.S. Cl. 156—128                              6 Claims

ABSTRACT OF THE DISCLOSURE

In the present invention, which relates to a manufacture of pneumatic tires, the tire carcass is constructed with a crown portion having a diameter less than that of the carcass in the finished tire. A tread portion is located around the crown portion of the carcass and comprises a plurality of filaments which are longitudinally compressed and are located within the tread. The carcass is formed to its shape in the finished tire and simultaneously the diameter of the tread portion is increased, thereby decompressing the filaments.

---

This invention relates to methods of manufacturing pneumatic tires, and is an improvement in or modification of the invention described in the complete specification of my co-pending U.S. patent application No. 364,-887, filed Apr. 29, 1964.

In this specification is described a method of manufacturing unvulcanised textile filamentary fabric comprising longitudinally compressing one textile filament or a plurality of textile filaments which are located side-by-side in substantially parallel relationship to one another, and applying unvulcanised rubber into adhering contact with the filament or filaments either before or after compression of the filament or filaments.

Pneumatic tires are known which incorporate annular tread reinforcement layers located within their rubber tread layers, the tread reinforcement layers incorporating substantially inextensible cords.

During molding of these tires, it has been found difficult to locate the tread reinforcement layers adjacent the ground contacting surfaces of the tires. This is because the projections provided on mold matrices to form the grooves between road gripping elements of the tire treads, prevent or restrict the radially outward expansion of the cords of the layers in between the projections.

Further, in cases where tread reinforcement layers have cords lying at low bias angles to the mid-circumferential planes of the tires, e.g. at angles below 25°, it has been found impossible to fully shape unshaped or partially shaped carcasses after the application of the reinforcement layers.

It is an object of the present invention to provide an improved method of manufacturing a pneumatic tire incorporating a tread reinforcement layer.

According to the present invention, a method of manufacturing a pneumatic tire comprises building a tire carcass having a crown portion with a diameter less than that of the crown portion of the carcass in the finished tire, locating a reinforced rubber tread portion around and in contact with the crown portion of the carcass, the tread portion comprising a plurality of filaments each of which is in a longitudinally compressed condition and disposed within the rubber of the tread portion and forming the carcass into substantially its shape in the finished tire simultaneously to increase the diameter of the tread portion and partially or substantially completely to decompress the filaments.

The invention also includes a pneumatic tire made by the method defined in the last preceding paragraph.

Embodiments of the invention will now be described by way of example with reference to the accompanying drawing in which.

Figure 1:
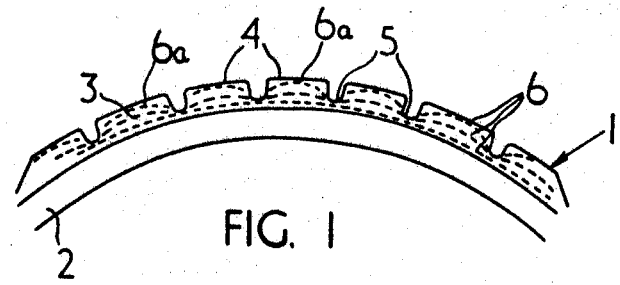
FIGURE 1 is a cross section of the crown portion of a pneumatic tire manufactured according to the invention.

In a first embodiment, a pneumatic aircraft tire 1 (FIGURE 1) is provided with a carcass 2 incorporating in known manner a nylon cord reinforcement, and a reinforced rubber tread portion 3 attached to the radially outer periphery of the carcass. The tread 3 is provided with a plurality of axially-spaced circumferentially extending ground-contacting ribs 4 which are separated by circumferential grooves 5. Three annular tread reinforcement layers 6, superposed one upon the other and spaced apart are embedded within the tread portion and extend from side-to-side of the tread portion, the three layers, viewed in a cross-section of the tire containing its axis of rotation, extending radially outwardly into the ground-contacting ribs 4 with portions 6a of the radially outer layer lying adjacent to and substantially parallel to the ground-contacting surface of the ribs of the tread and to the radially extending wall of the ribs. Each tread reinforcement layer comprises a plurality of parallel nylon cords which extend across the tire at an angle of substantially 29° to the mid-circumferential plane of the tire, the angle of the cords in any one layer being of opposite sense with respect to said plane, to the cords in an adjacent layer or layers.

Figure 2:
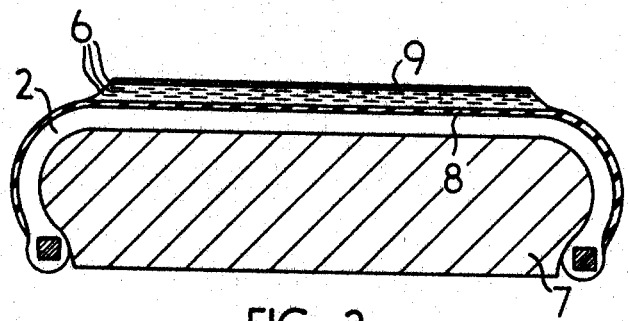
FIGURE 2 is a cross section of the tire of FIGURE 1 mounted on a former during manufacture thereof.

During manufacture, the carcass of the tire is built on a low crown former 7 (FIGURE 2) with the crown portion of the carcass 2 in a substantially cylindrical condition. The tread reinforcement layers 6 are each formed, before incorporation into the tread portion, by longitudinally compressing and rubberising the nylon cords in the manner described in the complete specification of patent application No. U.S. 364,887.

In a case where the fabric includes a monofilament or monofilaments the monofilament is crimped by a longitudinally compressive force to longitudinally compress it. In a case where the fabric includes filaments in the form of a cord or cords, the cord may be longitudinally compressed to cause some of the strands constituting each cord to move outwardly from one another; and where each strand is one or more monofilament, some or all of the monofilaments may move outwardly from one another. However, the cord may be constrained to follow a wave-like pattern to longitudinally compress the cord in addition to, or instead of, the relative outward movement of the strands.

The rubber may be applied to the filament or filaments after the filament has been longitudinally compressed. Preferably, the unvulcanized rubber is applied to the filament or filaments in two layers, one on each side of the filament or filaments, and one or both of the layers may be applied before or after longitudinal compression of the filament or filaments. The nylon cords are compressed to lengths which are 69.5% of their original lengths. The rubber of the tread is formed from radially inner strip 8 of extruded rubber stock and a radially outer strip 9 of extruded rubber stock which is thin compared with the radially inner strip.

To assemble the tread layers onto the carcass, the radially inner strip 8 of rubber stock which has a length sufficient to extend from bead to bead of the carcass is wrapped around the carcass 2 built on the low crown former 7, the three tread reinforcement layers 6 with their cords in longitudinally compressed conditions, then being placed around the radially inner strip with the cords in each layer lying at an angle of 47° to the mid-circumferential plane of the tire and the angle of the cords in one layer disposed in an opposite sense to that of the cords in an adjacent layer. The relatively thin radially outer strip 9 of rubber stock is superposed upon the reinforcement layers.

When the tire is completely assembled it is inflated in a conventional manner into a toroidal condition and placed within a tire mold to be molded and vulcanized. During shaping into a toroidal condition, the diameter and circumferential length of each tread reinforcement layer is increased, this increase being accompanied by decompression of the nylon cords in the layer and a change in cord angle from 47° to 29° to the mid-circumferential plane. During final shaping when the tire is inflated into contact with the molding surface of the mold to mold the tire, the rubber of the tread is forced, by inflationary pressure within the tire, between rigid projections of the tread molding surface of the mold, the projections displacing the tread rubber to form the grooves and ribs on the outer peripheral surface of the tread. During this operation, the portions 6a of cords of the reinforcement layers lying between the mold projections are expanded radially outwardly, by further decompression of the portions of the cords, in between the mold projections so that the cords follow the mold rib contours and the distance between the tread reinforcement layers and the ground-contacting radially outer peripheral surface of the ribs of the tread does not increase significantly during molding. After molding, the said portions 6a of the cords in the reinforcement layers are in a substantially fully decompressed condition and lie adjacent the ground-contacting surface of the ribs of the tread.

Figure 3:
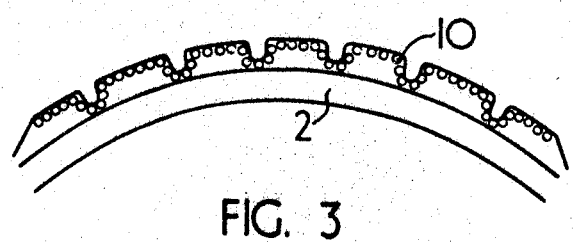
FIGURE 3 is a cross section of the crown portion of a second pneumatic tire manufactured according to the invention.

In a second embodiment, shown in FIGURE 3, a pneumatic aircraft tire is of construction similar to that described in the first embodiment except that, instead of comprising three tread reinforcement layers, it incorporates a single tread reinforcement layer 10 which comprises a plurality of nylon cords which are disposed at an angle of substantially 0° to the mid-circumferential plane of the tire.

The tire is manufactured in a manner similar to that described for the first embodiment, the radially inner rubber tread strip 8, the tread reinforcement layer 10, and the radially outer tread strip 9, being wrapped around the substantially cylindrically built crown portion of the carcass 2 of the tire with the cords of the reinforcement layer in a compressed condition.

During shaping and molding of the raw tire after completion of building, the cords of the tread reinforcement layer are decompressed during tire expansion, the cords being substantially decompressed when the reinforcement reaches a position at which some of the cords lie adjacent the projections provided on the mold surface. Further expansion of the tire results in part of the tread portion being forced between the mould projections to form the ribs, the cords of the tread reinforcement between the ribs having their diameters increased by longitudinal stretching and further decompression of the cords so that they lie adjacent the ground contacting surfaces of the ribs.

Having now described my invention, what I claim is:

1. In a method of manufacturing a pneumatic tire having a plurality of grooves and reinforced tread projections, the steps comprising: building a tire carcass having a crown portion of a diameter less than that of the crown portion of the carcess in the finished tire, disposing a reinforced rubber tread portion around and in intimate contact with the crown portion of the carcess, the tread portion comprising a plurality of filaments each of which is in a longitudinally compressed condition and disposed within the rubber of the tread portion, at spaced intervals throughout the width of the tire shaping the carcass into substantially the shape thereof in the finished tire and thereby increasing the diameter of the tread portion to effect a decompressing of the said filament, simultaneously forming the tread portion with a plurality of grooves and projections and simultaneously displacing at least some of the said filaments into the projections of the tread during molding of the tire, said filaments being relatively inextensible in their expanded decompressed condition.

2. A method according to claim 1 comprising building the crown portion of the carcass in a substantially cylindrical form preliminary to its receiving said tread portion.

3. A method according to claim 1 including the step of molding the tire and forming the tread portion with a plurality of grooves and projections, some of the filaments extending into the projections during molding.

4. A method according to claim 1 wherein said filaments are located at an angle of 87° to the mid-circumferential plane of the tire and upon decompression at final shaping are located at an angle of 29° to the mid-circumferential plane.

5. The method of manufacturing in accordance with claim 1 wherein during forming, the rubber of said tread is forced under inflating pressure between rigid portions of the tread molding surface of the mold thereby to form the grooves and ribs on the outer periphery of said tire.

6. The method of manufacturing in accordance with claim 1 wherein said tread portion incorporates a single tread reinforced layer of said filaments which are disposed at an angle of 0° to the mid-circumferential plane of the tire and are decompressed during tire inflation.

References Cited

UNITED STATES PATENTS

| | | | |
|---|---|---|---|
| 2,884,044 | 4/1959 | Hulswit | 156—110 |
| 2,479,474 | 8/1949 | Crooker | 156—96 X |
| 2,943,663 | 7/1960 | Antonson | 152—361 X |
| 3,111,975 | 11/1963 | Sanders et al. | 152—361 |
| 3,133,583 | 5/1964 | Dobson | 152—361 X |
| 3,149,658 | 9/1964 | Wolfe | 156—95 X |
| 3,225,812 | 12/1965 | Barrett | 152—361 |
| 3,233,649 | 2/1966 | Jolivet et al. | 152—361 |
| 3,314,839 | 4/1967 | Hough | 156—96 X |

HAROLD ANSHER, Primary Examiner

C. B. COSBY, Assistant Examiner

U.S. Cl. X.R.

152—361